Patented Jan. 11, 1938

2,105,390

UNITED STATES PATENT OFFICE 2,105,390

PURIFICATION OF SUCROSE OCTANITRATE

Joseph A. Wyler, Allentown, Pa., assignor to Trojan Powder Company, Allentown, Pa.

No Drawing. Application June 27, 1936, Serial No. 87,762

4 Claims. (Cl. 260—148)

My invention relates to the purification of sucrose nitrate and more particularly relates to a process for the purification of sucrose octanitrate characterized by the crystallization of said sucrose octanitrate from a solvent.

The object of my invention is to provide a new and improved method of purifying commercial sucrose octanitrate, and of obtaining pure and stable sucrose octanitrate from crude or impure products containing sucrose octanitrate.

Efforts have been made in the past to purify sucrose octanitrate by means of methyl alcohol and ethyl alcohol but in spite of numerous painstaking attempts the work has invariably resulted in either failure to obtain a crystalline product, the product obtained being either gummy or doughy, and being unstable to heat, or when crystals have been obtained, these have been obtained by the evaporation of the solvent this being impractical particularly for explosives materials. Some investigators have used a mixture of ethyl alcohol and ether and have thus obtained pure crystalline sucrose octanitrate by simple evaporation at room temperature.

I have discovered that if sucrose octanitrate be dissolved in one of the following liquids: Methyl alcohol, ethyl alcohol, propyl alcohol, butyl alcohol, amyl alcohol, hexyl alcohol, carbon tetrachloride, ethylene dichloride and propylene dichloride in such a manner as to provide a saturated solution of the sugar nitrate in the particular solvent, at a temperature not to exceed 80° C. and if then this solution be slowly cooled, a crystalline separation of sucrose octanitrate takes place, which sucrose octanitrate, after washing and drying, is practically chemically pure.

I have also discovered that mixtures of these solvents function in the same manner, although to a different degree, as the individual solvents mentioned above. Thus, I may use a mixture of methyl and ethyl alcohol; of methyl and propyl alcohol; of methyl and butyl alcohol; of methyl and amyl alcohol; of methyl and hexyl alcohol; of ethyl and propyl alcohol, etc. Also, I may use a mixture of methyl alcohol and carbon tetrachloride; of methyl alcohol and ethylene dichloride; of methyl alcohol and propylene dichloride, and of the other alcohols with these chlorides. Furthermore, I may use a mixture of carbon tetrachloride and ethylene dichloride; of carbon tetrachloride and propylene dichloride; and of ethylene dichloride and propylene dichloride. In other words, due to the solvent properties of the above mentioned liquids, both for one another and for sucrose octanitrate, I have here a group of substances so related to one another that they naturally function cooperatively with one another to produce solvent mixtures useful for the crystallization of sucrose octanitrate.

Naturally, with such a large number of possible combinations of these solvents which may be used in my process of purification, it is impossible to express the best mode of operation by any single set of operating conditions, particularly as these would have to be modified with changes in the nature of the crude sucrose octanitrate which is to be purified. However, the following examples, together with the precautions mentioned below, should suffice to enable a person trained in this art to carry out my process successfully.

EXAMPLE No. 1

*Ethyl alcohol alone*

About 20 parts (by weight) of the impure sucrose octanitrate are added to 80 parts of ethyl alcohol (95% by volume) and the mixture heated, with stirring, to a temperature of about 75° C. The mixture is allowed to settle in the hot and the supernatant liquor run out into a crystallizing vessel, provided with a stirrer and a jacket for water cooling. The water cooling is not used until definite crystals have begun to form through slow cooling, when the rate of cooling may be increased by increasing the rate of flow of the cooling water through the jacket. Cool to about 15° C. Filter and wash the crystals with ethyl alcohol, catching this wash alcohol separately. The crystals are then dried or washed with water on the filter and then dried at 40–60° C.

The alcohol washings which were reserved separately may be used as the first wash for the next batch or for the purpose of dissolving a fresh batch of sucrose octanitrate.

The mother liquor may be used over again as often as the particular conditions allow.

The water wash containing alcohol is distilled in the presence of lime or any suitable alkali for the purpose of recovering the alcohol contained therein.

EXAMPLE No. 2

*Propylene dichloride alone*

About 32 parts (by weight) of the impure sucrose octanitrate are added to 68 parts of propylene dichloride, the mixture heated, with stirring, to a temperature of about 75° C. and the crystals obtained as described in Example No. 1.

When using propylene dichloride as a solvent, the cooling should be carried out more slowly than in the case of methyl or ethyl alcohol, particularly during the early stages of the crystallization.

The crystals of sucrose octanitrate are separated from the mother liquor by filtration and washed on the filter with fresh propylene dichloride. The product is then dried at 40–60° C.

Example No. 3

*A mixture of methyl and ethyl alcohols*

About 35 parts (by weight) of the impure sucose octanitrate are added to 65 parts of a solvent consisting of 50% of methyl alcohol and 50% of ethyl alcohol (by weight) and the mixture heated to the boiling point of the methyl alcohol. The mixture is allowed to settle in the hot, or filtered hot, and the clear liquor run into a crystallizer. The cooling of this liquor may be carried out at a greater rate than would be the case if ethyl alcohol alone were used as a solvent, and still receive clear, distinct crystals of sucrose octanitrate.

The crystals are then handled in the same manner as in Example No. 1.

Example No. 4

*Mixture of methyl, ethyl and amyl alcohols*

About 45 parts (by weight) of impure sucrose octanitrate are added to 100 parts (by weight) of a solvent consisting of:

| | Percent |
|---|---|
| Methyl alcohol (by weight) | 45 |
| Ethyl alcohol (by weight) | 45 |
| Amyl alcohol (by weight) | 10 | and the mixture heated, with stirring, to a temperature of about 65° C. for about one-half hour. The hot mixture is allowed to settle, or is filtered, and the clear solution is run into a crystallizing vessel provided with a stirrer and a jacket for water cooling. The remainder of the process is carried out essentially as described under Example No. 1.

Example No. 5

*A mixture of carbon tetrachloride and ethylene dichloride*

About 52 parts (by weight) of impure sucrose octanitrate are added to 100 parts (by weight) of a solvent consisting of 70% (by weight) of carbon tetrachloride and 30% of ethylene dichloride, and the mixture heated, with stirring, to a temperature of about 80° C. in order to dissolve all the sucrose octanitrate. The hot mixture is allowed to settle, or is filtered, and the clear solution is run into a crystallizing vessel provided with a stirrer and a jacket for water cooling. In this case, however, the cooling must be done very slowly at the start and, preferably, after some seeds have been added to the hot liquor.

The crystals are separated, washed and dried in the manner indicated by Example No. 2.

Example No. 6

*A mixture of methyl alcohol and carbon tetrachloride*

About 52 parts (by weight) of impure sucrose octanitrate are added to 100 parts (by weight) of a solvent consisting of:

| | Percent |
|---|---|
| Methyl alcohol (by weight) | 75 |
| Carbon tetrachloride (by weight) | 25 | and the mixture heated, with stirring, to a temperature of about 65° C. for about one-half hour. The hot mixture is then handled in essentially the same manner as in Example No. 1.

The mother liquors and the washings may be used over and over according to the circumstances, and each solvent may be recovered by distillation.

In general, I prefer to carry out my process as described in the above examples. However, I may vary the proportion of sucrose octanitrate to solvent, the saturation temperature of the solution, the rate of cooling, the manner of separating the solution from the undissolved portion, and the manner of separating, washing and drying of the crystals, without departing from the spirit of this invention. Such variations in the operating details are necessary due to the variations in the solvent properties of the solvents used in my process and also due to variations in the purity of the sucrose octanitrate to be purified.

No matter what solvent or solvent mixture is chosen from those mentioned above, it will readily be determinable just how to carry out my process if the following precautions are observed.

First it is necessary to avoid making too strong or concentrated a solution of sucrose octanitrate in the solvent chosen. If more than enough sucrose octanitrate is dissolved in the chosen mixture than is needed to make a solution saturated at about 80° C., the first sucrose octanitrate to separate on cooling will be gummy and not crystalline and will not be of suitable purity because it will carry impurities within itself.

The second precaution which is necessary in order to successfully carry out my process, is to regulate the rate of cooling of the sucrose octanitrate solution. It is impossible to give any exact figure which would express what this rate of cooling must be, as it is dependent upon too many variables. However, it is relatively easy for the operator to standardize on this rate of cooling by simply observing, by means of test samples, the condition of the crystals which are separating during a given set of operating conditions. If a gumminess is forming in the crystal mass, the rate of cooling should be decreased; if the crystals are clear, and definitely formed, the rate of cooling is satisfactory. When the temperature of the crystallizing batch has dropped down to 50° C. the rate of cooling may be increased without causing any gumminess. In this connection it should be borne in mind that pure sucrose octanitrate exhibits the phenomena of supercooling to a very marked degree and that stirring of the crystallizing batch is a distinct advantage from the standpoint of preventing the formation of a gummy product.

A third precaution to observe in the use of my process, is to take into consideration how much moisture may be present in the crude sucrose octanitrate to be purified. If the crude sucrose octanitrate is dry, no particular difficulty is experienced, but if it is moist it is usually better to use the lower alcohols, as these are miscible with water in all proportions. If the higher alcohols are used it may be necessary to separate the water layer which forms on the surface of the solution before running the solution to the crystallizer.

As mentioned above, I may use carbon tetrachloride, ethylene dichloride, or propylene dichloride in admixture with the alcohols. When this is done, the resulting solvent is characterized by low flammability and reduced fire and explosion hazards.

The sucrose octanitrate made by my process will usually be in the form of clear, colorless, needles or prisms of M. P. 86–88° C.; of 15.85% N by nitrometer methods; and of exceptionally good stability toward heat.

It will be evident that many changes may be made within the limitation of the disclosure as herein made, and accordingly no limitations should be placed upon my invention, except as indicated in the appended claims.

I claim:

1. The process of purifying sucrose octanitrate which comprises crystallizing sucrose octanitrate from a solvent comprising predominately one or more members of the group consisting of: propyl alcohol, butyl alcohol, amyl alcohol, hexyl alcohol, carbon tetrachloride, ethylene dichloride, propylene dichloride, methyl alcohol, ethyl alcohol, such crystallization taking place from a solution of a concentration not to exceed saturation at 80° C., and being the direct result of a slow lowering of the temperature of the solution at a rate faster than the ordinary rate of cooling of a body of equal mass from normal radiation.

2. The process of purifying sucrose octanitrate which comprises dissolving the impure sucrose octanitrate in a hot solvent comprising predominantly one or more members of the group consisting of methyl alcohol, ethyl alcohol, propyl alcohol, butyl alcohol, amyl alcohol, hexyl alcohol, carbon tetrachloride, ethylene dichloride, propylene dichloride, separating the insoluble material, and crystallizing the sucrose octanitrate from the solution; such crystallization taking place from a solution of a concentration not to exceed saturation at 80° C. and being the direct result of a slow lowering of the temperature of the solution at a rate faster than the ordinary rate of cooling of a body of equal mass from normal radiation.

3. The process of purifying sucrose octanitrate which comprises dissolving the impure sucrose octanitrate in a hot solvent comprising predominantly one or more members of the group consisting of methyl alcohol, ethyl alcohol, propyl alcohol, butyl alcohol, amyl alcohol, hexyl alcohol, carbon tetrachloride, ethylene dichloride, propylene dichloride, filtering off the insoluble material, and crystallizing the sucrose octanitrate from the solution; such crystallization taking place from a solution of a concentration not to exceed saturation at 80° C. and being the direct result of a slow lowering of the temperature of the solution at a rate faster than the ordinary rate of cooling of a body of equal mass from normal radiation.

4. The process of purifying sucrose octanitrate which comprises dissolving the impure sucrose octanitrate in a hot solvent comprising predominantly one or more members of the group consisting of methyl alcohol, ethyl alcohol, propyl alcohol, butyl alcohol, amyl alcohol, hexyl alcohol, carbon tetrachloride, ethylene dichloride, propylene dichloride, separating the insoluble material, and crystallizing the sucrose octanitrate from the solution; such crystallization being the direct result of slow cooling from 65° C. to 15° C.

JOSEPH A. WYLER.